(12) United States Patent
Au et al.

(10) Patent No.: US 10,873,905 B2
(45) Date of Patent: Dec. 22, 2020

(54) APPARATUS AND METHOD FOR A WIRELESS DEVICE TO RECEIVE DATA IN AN ECO STATE

(71) Applicants: Kelvin Kar Kin Au, Kanata (CA); Liqing Zhang, Ottawa (CA); Jianglei Ma, Ottawa (CA)

(72) Inventors: Kelvin Kar Kin Au, Kanata (CA); Liqing Zhang, Ottawa (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 13 days.

(21) Appl. No.: 16/152,509

(22) Filed: Oct. 5, 2018

(65) Prior Publication Data

US 2019/0045436 A1 Feb. 7, 2019

Related U.S. Application Data

(63) Continuation of application No. 15/649,995, filed on Jul. 14, 2017, now Pat. No. 10,142,929, which is a
(Continued)

(51) Int. Cl.
*H04W 52/02* (2009.01)
*H04W 68/00* (2009.01)
*H04W 76/27* (2018.01)

(52) U.S. Cl.
CPC ... *H04W 52/0209* (2013.01); *H04W 52/0216* (2013.01); *H04W 68/00* (2013.01);
(Continued)

(58) Field of Classification Search
None
See application file for complete search history.

(56) References Cited

U.S. PATENT DOCUMENTS

2007/0238438 A1 10/2007 Alon et al.
2008/0232373 A1 9/2008 Iyer et al.
(Continued)

FOREIGN PATENT DOCUMENTS

CN 101127662 A 2/2008
CN 101193016 A 6/2008
(Continued)

OTHER PUBLICATIONS

U.S. Appl. No. 14/150,539, filed Jan. 8, 2014.

*Primary Examiner* — Diane L Lo (57) ABSTRACT

An apparatus and method for a wireless device to receive data in an eco state is provided. According to an embodiment of the disclosure, upon determining that data is to be transmitted to the wireless device in the eco state, a network node operates to transmit a unicast notification message to the wireless device in order to inform the wireless device of the impending data transmission. According to another embodiment of the disclosure, in response to receiving the unicast notification message, the wireless device operates to receive the data in accordance with the unicast notification message. To this end, the wireless device might for example try to receive data for a time period following the unicast notification message. Meanwhile, the wireless device may remain in the eco state.

25 Claims, 5 Drawing Sheets

Related U.S. Application Data continuation of application No. 14/609,707, filed on Jan. 30, 2015, now Pat. No. 9,736,774.

(52) U.S. Cl.
CPC ........ *H04W 52/0229* (2013.01); *H04W 76/27* (2018.02); *Y02D 30/70* (2020.08)

(56) References Cited

U.S. PATENT DOCUMENTS

| | | | |
|---|---|---|---|
| 2009/0109907 A1 | 4/2009 | Tsai et al. | |
| 2010/0254293 A1 | 10/2010 | Son et al. | |
| 2010/0322124 A1 | 12/2010 | Luoma et al. | |
| 2012/0213137 A1 | 8/2012 | Jeong et al. | |
| 2012/0281566 A1* | 11/2012 | Pelletier | H04W 72/1221 370/252 |
| 2012/0307660 A1 | 12/2012 | Lindoff et al. | |
| 2014/0112229 A1 | 4/2014 | Merlin et al. | |
| 2014/0192767 A1 | 7/2014 | Au et al. | |
| 2014/0286222 A1 | 9/2014 | Yu et al. | |
| 2014/0321388 A1 | 10/2014 | Jeong et al. | |

FOREIGN PATENT DOCUMENTS

| | | | |
|---|---|---|---|
| CN | 101873537 A | 10/2010 |
| CN | 102421171 A | 4/2012 |
| CN | 102612119 A | 7/2012 |
| CN | 102804877 A | 11/2012 |
| CN | 102804899 A | 11/2012 |
| CN | 103379595 A | 10/2013 |
| CN | 103493549 A | 1/2014 |
| EP | 2667667 A1 | 11/2013 |
| JP | 2014506770 A | 3/2014 |
| KR | 20120095805 A | 8/2012 |
| WO | 2015000912 A1 | 1/2015 |

* cited by examiner

APPARATUS AND METHOD FOR A WIRELESS DEVICE TO RECEIVE DATA IN AN ECO STATE

CROSS-REFERENCE TO RELATED APPLICATION

This application is a continuation of U.S. patent application Ser. No. 15/649,995, filed on Jul. 14, 2017, entitled "APPARATUS AND METHOD FOR A WIRELESS DEVICE TO RECEIVE DATA IN AN ECO STATE", which is a continuation of U.S. patent application Ser. No. 14/609,707, filed on Jan. 30, 2015, entitled "APPARATUS AND METHOD FOR A WIRELESS DEVICE TO RECEIVE DATA IN AN ECO STATE". Each of these applications is incorporated in its entirety herein by reference.

FIELD OF THE DISCLOSURE

This application relates to wireless communication, and more particularly to transmitting data to a wireless device while the wireless device is in an eco state.

BACKGROUND

A wireless device may communicate with a wireless network. However, the sort of communication that is possible may depend on a state of the wireless device. A wireless device might transition from an energy saving state to an active state in order to enhance the sort of communication that is possible. However, such transition may introduce overhead.

SUMMARY OF THE DISCLOSURE

According to an embodiment of the disclosure, upon determining that data is to be transmitted to a wireless device in an eco state, a network node operates to transmit a unicast notification message to the wireless device. The unicast notification message informs the wireless device of the impending data transmission. The network node then transmits the data to the wireless device in the eco state.

According to another embodiment of the disclosure, after receiving the unicast notification message, the wireless device operates to receive the data in accordance with the unicast notification message. To this end, the wireless device might for example try to receive data for a time period following the unicast notification message. Meanwhile, the wireless device may remain in the eco state.

According to another embodiment of the disclosure, unicast notification for a wireless device in the eco state can be conditionally enabled or disabled based on one or more factors.

Other aspects and features of the present disclosure will become apparent, to those ordinarily skilled in the art, upon review of the following description of the various embodiments of the disclosure.

BRIEF DESCRIPTION OF THE DRAWINGS

Embodiments will now be described by way of example with reference to the attached drawings in which.

DETAILED DESCRIPTION OF EMBODIMENTS

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Introduction

Figure 1:
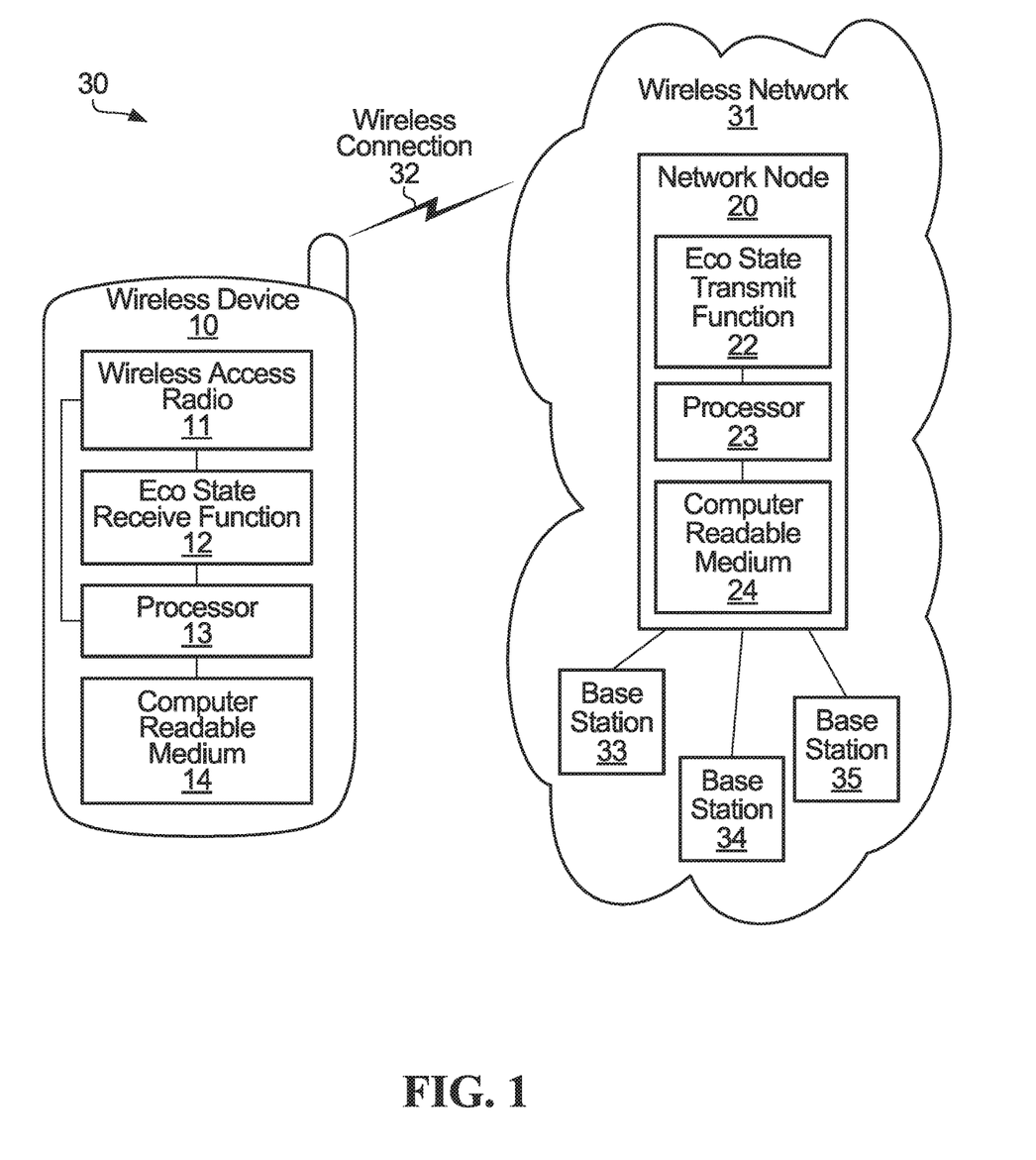
FIG. 1 is a schematic of a wireless system featuring a wireless device and a wireless network, in accordance with an embodiment of the disclosure.

Referring now to FIG. 1, shown is a schematic of a wireless system 30 featuring a wireless device 10 and a wireless network 31. The wireless device 10 has a wireless access radio 11, circuitry implementing an eco state receive function 12, a processor 13, a computer-readable medium 14, and may have other components that are not specifically shown. Note that there may be numerous other wireless devices in addition to the wireless device 10, but they are not specifically shown. The wireless network 31 has a network node 20, several base stations 33,34,35 and may have other components that are not specifically shown. Note that the wireless network 31 may include wired components even though the wireless network 31 is described as being wireless. The network node 20 has circuitry implementing an eco state transmit function 22, a processor 23, a computer-readable medium 24, and may have other components that are not specifically shown. The network node 20 may be a discrete component or integrated with one or more network components. For example, the network node 20 might be a network controller separate from the base stations 33,34,35, or form part of one or more of the base stations 33,34,35.

Operation of the wireless system 30 will now be described by way of example. The wireless device 10 is capable of communicating with the wireless network 31 using its wireless access radio 11. Likewise, the wireless network 31 is capable of communicating with the wireless device 10 using one or more of its base stations 33,34,35. However, the sort of communication that is possible may depend on a state of the wireless device 10. For instance, when the wireless device 10 is in an active state, such communication may include a wide range of message traffic for session based applications such as web browsing, file transfer, instant messaging, chatting, gaming, etc. However, when the wireless device 10 is in an eco state, communication is more limited. Moreover, when the wireless device 10 is in the eco state, the wireless device 10 may not know when or if any data transmissions are going to be received from the wireless network 31. The wireless device 10 could transition from the eco state to the active state. However, such transition may introduce overhead.

According to an embodiment of the disclosure, upon determining that data is to be transmitted to the wireless device 10 in the eco state, the eco state transmit function 22 of the network node 20 operates to transmit a unicast notification message to the wireless device 10. The unicast notification message serves to inform the wireless device 10 of an impending data transmission, and may for example be provided on a control channel or another channel having low resources. According to another embodiment of the disclosure, in response to receiving the unicast notification message, the eco state receive function 12 of the wireless device 10 operates to receive the data in accordance with the unicast notification message. To this end, the wireless device 10 might for example try to receive data over a data channel for a time period following the unicast notification message. Meanwhile, the wireless device 10 may remain in the eco state and may therefore benefit from power saving features of the eco state that would not be experienced if the wireless device 10 had instead transitioned to the active state.

The "eco state" is a power saving state that utilises fewer resources than the active state. Specific example details of the eco state will now be provided. The eco state may support always-on connections by permitting some message traffic for non-session based applications. Wireless terminals may maintain a closer association to the wireless network 31 in the eco state than before, as light traffic can be exchanged intermittently in a grant-free/scheduling-free transmission mode. In particular, the eco state may support data transmission and reception with a light connection management mechanism, which typically means that there is no need for short-term link connection reports by the wireless device 10 and no need for dynamic resource allocation requests and grants from the network node 20. A short-term link connection report is a report on a channel quality (e.g. signal-to-interference-plus-noise ratio) over a short period of time (e.g. one or several milliseconds), and the report may be sent frequently. The eco state may employ a semi-persistent and/or persistent scheduling with semi-static link adaptation and/or a grant-free transmission mechanism. Furthermore, the eco state may allow for the maintenance of an identifier for a user device to facilitate data transmission and/or reception while in the eco state. The eco state may permit fast transitions to the active state using a dedicated connection signature.

When the wireless device 10 is in the eco state, the wireless device 10 may periodically send measurement related information to the network node 20 on a relatively infrequent basis. The measurement related information might for example include one or more of uplink sounding reference signals, measurement from downlink pilots and/or data, uplink data, mobility tracking information such as GPS (Global Positioning System) information, and location prediction information. The measurement related information may be used by the wireless network 31 to determine where the wireless device 10 is located and/or the channel quality of the wireless device 10. Based on this information, when transmitting data to the wireless device 10, the wireless network 31 can select one or more base stations 33,34,35 to transmit the data. The wireless network 31 may also determine how each selected base station is to transmit the data, for example by determining coding and modulation levels for each selected base station or a group of base stations. However, there may be scenarios in which the measurement related information provided on the relatively infrequent basis is insufficient for the wireless network 31 to precisely determine where the wireless device 10 is located. Such scenarios might for example include physical movement of the wireless device 10.

According to another embodiment of the disclosure, in response to receiving the unicast notification message, the eco state receive function 12 of the wireless device 10 operates to transmit, while the wireless device 10 is in the eco state, measurement related information to the wireless network 31. The measurement related information may assist the network node 20 in determining where the wireless device 10 is located so that the data can be transmitted accordingly. Examples of measurement related information have been provided above. In some implementations, the measurement related information is provided on a more frequent basis than the relatively infrequent basis. The increased frequency might for example be based on some pre-defined configuration. In any event, by using the measurement related information provided in response to the unicast notification message, the network node 20 can then determine where the wireless device 10 is located and transmit the data to the wireless device 10 in the eco state accordingly. In some implementations, after receiving the data transmission, the wireless device 10 responds with an ACK/NAK (Acknowledgement or Negative-Acknowledgment) response to confirm receipt.

It is to be understood that the network node 20 may not need to receive any measurement related information prior to data transmission. It may be sufficient to rely on previous measurement related information, for example, if the wireless device is not moving. Also, if the data can be transmitted with a predefined modulation and coding level (e.g. a robust modulation and coding level in the wireless system 30), then measurement related information may be unnecessary. Thus, the wireless device 10 may alternatively refrain from sending any measurement related information in response to the unicast notification message. In some implementations, the eco state receive function 12 of the wireless device 10 is configured to conditionally send measurement related information in response to the unicast notification message depending on various factors such as whether the wireless device 10 has been moving and/or whether the wireless system 30 uses a robust modulation and coding level.

Note that the unicast notification message is a message sent to the wireless device 10 in a unicast manner. This differs from multicast messages such as paging messages, which are broadcasted to numerous wireless devices of a paging group even when it may be desired to locate only one of those wireless devices. Each time a paging message is sent, there may be numerous wireless devices receiving the paging message thereby creating signalling overhead for those wireless devices. This signalling overhead tends to grow as the number of wireless devices increases. In contrast, by using the unicast notification message instead of a paging message, there is less signalling overhead for the wireless system 30 as a whole because the unicast notification message is not received by other wireless devices.

Although unicast notification is used as an alternative to paging messages, there may be situations in which paging messages may be used as a back-up procedure. For instance, if the wireless network 31 cannot locate the wireless device 10 whatsoever (e.g. unicast notification does not result in receiving measurement related information from which the location of the wireless device 10 can be determined, and/or the subsequent data transmission does not result in an ACK/NAK response from the wireless device 10), then a paging message may be broadcasted as a back-up procedure.

Using paging messages as a back-up procedure may increase robustness of the wireless system 30 as a whole, while avoiding signalling overhead of paging messages when possible. In the event that the wireless device 10 is not mobile but instead forms part of a home appliance such as a refrigerator, then it is unlikely that paging messages would be necessary. However, in the event that the wireless device 10 is a mobile device, then it may be possible that the wireless device 10 could become missing from the perspective of the wireless network 31, and if this happens, then a paging message may be broadcasted to help locate the wireless device 10. In another example, if the subsequent data transmission does not result in the wireless network 31 receiving an ACK/NAK response from the wireless device 10, then the unicast notification procedure can be retried one or more times. In yet another example, after retries of the unicast notification procedure, the wireless network 31 can then fall back to the paging procedure.

The eco state transmit function 22 of the network node 20 and the eco state receive function 12 of the wireless device 10 enable the wireless device 10 to receive data while the wireless device 10 is in the eco state. In this regard, there is no need for the wireless device 10 to transition to another state such as the active state. Note that transitioning from one state to another can introduce overhead. Moreover, the active state introduces further overhead such as handshake signalling for scheduling transmissions. Thus, by enabling the wireless device 10 to remain in the eco state, any overhead involved in transitioning to the active state can be avoided. Meanwhile, power saving features of the eco state may be exploited by the wireless device 10. This might result in longer battery life for the wireless device 10 in the event that the wireless device 10 is a mobile device powered by a battery.

However, in some implementations, for large data payloads, the wireless device 10 transitions to the active state. For instance, if the wireless device 10 is to have message traffic for a session based application to download a large data file, then the session based application may trigger the wireless device 10 to transition to the active state. Although the active state may not provide all of the power saving features of the eco state, it may support larger data payloads. The precise size of data payloads for which it is preferred to transition to the active state is implementation-specific and may depend on traffic conditions.

Unicast notification allows the wireless device 10 to receive data while the wireless device 10 is in the eco state even if the wireless device 10 has physically moved. However, unicast notification may be unnecessary if the measurement related information provided on the relatively infrequent basis is sufficient for the wireless network 31 to precisely determine where the wireless device 10 is located. This may be the case for example if the wireless device 10 is not a mobile device but instead forms part of a home appliance such as a refrigerator. According to another embodiment of the disclosure, the eco state transmit function 22 of the network node 20 operates to conditionally enable or disable unicast notification. Unicast notification may be conditionally enabled or disabled based on whether the wireless device 10 is mobile, or for other reasons as described later with reference to FIG. 4.

There are many possibilities for the wireless network 31. In some implementations, the wireless network 31 is a VRA (Virtual Radio Access) network. VRA networks normally determine the best transmit points to serve wireless terminals with the help of measurement related information, examples of which have been provided above. In the case of the wireless device 10 shown in FIG. 1, there may be more than one base station 33,34,35 serving the wireless device 10. The wireless network 31 would know which base station 33,34,35 is to send data to the wireless device 10 when the wireless device 10 is in the active state or the eco state.

In alternative implementations, the wireless network 31 is some other type of network. For instance, the wireless network 31 may be an LTE (Long-Term Evolution) network or a WiMAX (Worldwide Interoperability for Microwave Access) network, but with suitable modification where appropriate. LTE networks and WiMAX networks normally page a wireless device in an idle state to first locate the wireless device. Note that such paging is not necessary for VRA networks. As noted above, paging could be avoided and used as a back-up procedure.

There are many possibilities for the circuitry implementing the eco state transmit function 22 of the network node 20. In some implementations, the circuitry includes the processor 23, which is configured to implement the eco state transmit function 22 when instructions recorded on the computer-readable medium 24 are executed by the processor 23. In other implementations, the circuitry includes a DSP (Digital Signal Processor), an FPGA (Field Programmable Gate Array), an ASIC (Application Specific Integrated Circuit) and/or a microcontroller. More generally, the circuitry implementing the eco state transmit function 22 includes any appropriate combination of hardware, software and firmware.

There are many possibilities for the wireless device 10. The wireless device 10 might be a mobile terminal such as a tablet, smartphone, vehicle phone, etc. Alternatively, the wireless device 10 might be a fixed terminal and/or form part of a machine or a home appliance such as a refrigerator. Note that the wireless system 30 may have a mix of mobile terminals and fixed terminals.

There are many possibilities for the circuitry implementing the eco state receive function 12 of the wireless device 10. In some implementations, the circuitry includes the processor 13, which is configured to implement the eco state receive function 12 when instructions recorded on the computer-readable medium 14 are executed by the processor 13. In other implementations, the circuitry includes a DSP, an FPGA, an ASIC and/or a microcontroller. More generally, the circuitry implementing the eco state receive function 12 includes any appropriate combination of hardware, software and firmware.

There are many possibilities for the wireless access radio 11 of the wireless device 10. In some implementations, the wireless access radio 11 includes a receiver and a transmitter. The receiver may be coupled to a receive antenna while the transmitter is coupled to a transmit antenna. In some implementations, the wireless access radio 11 includes more than one receiver and more than one transmitter. The transmitter(s) and receiver(s) may be coupled to a processing unit, for example a DSP, for processing signalling.

Further example details of unicast notification are provided below with reference to FIGS. 2 through 5.

Wireless Network Method

Figure 2:
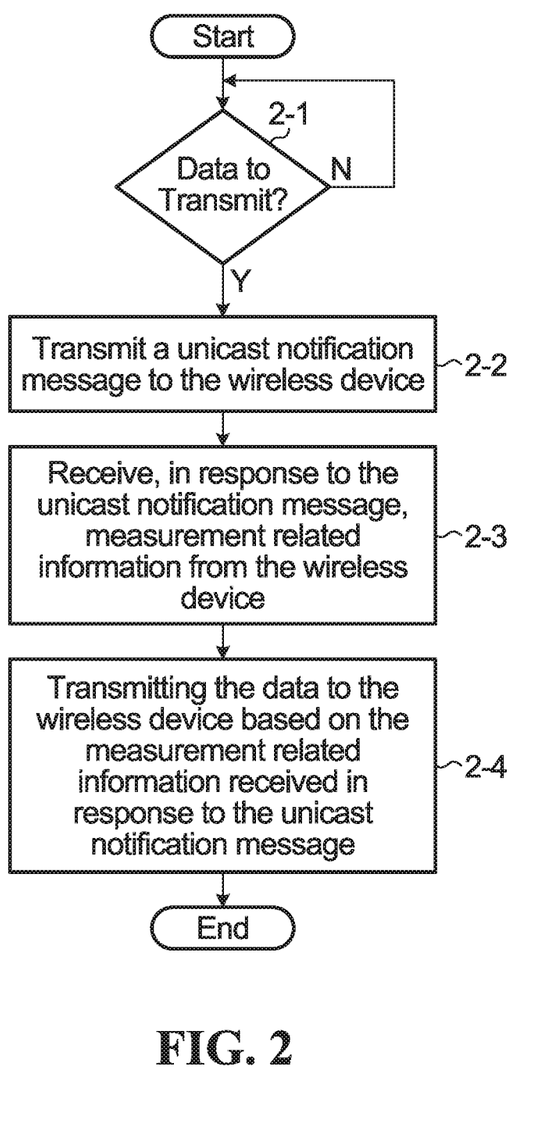
FIG. 2 is a flowchart of a method for a wireless network to transmit data to a wireless device while the wireless device is in an eco state, in accordance with an embodiment of the disclosure.

Referring now to FIG. 2, shown is a flowchart of a method for a wireless network to transmit data to a wireless device while the wireless device is in an eco state. This method may be implemented by a network node of a wireless network, for example by the eco state transmit function 22 of the network node 20 shown in FIG. 1. More generally, this method may be implemented by any appropriate network node. The network node may be a discrete component or integrated with one or more network components.

If at step 2-1 there is data to transmit to a wireless device in an eco state, then at step 2-2 the network node transmits a unicast notification message to the wireless device. The wireless device in the eco state receives the unicast notification message, which serves to inform the wireless device of an impending data transmission, and may for example be provided on a control channel or another channel having low resources. In some implementations, the wireless device in the eco state responds by sending measurement related information to the wireless network, as the measurement related information may assist the network node in determining where the wireless device is located so that the data can be transmitted accordingly. Examples of measurement related information have been provided above with reference to FIG. 1. If the wireless device in the eco state has responded with measurement related information, then at step 2-3 the network node may receive the measurement related information from the wireless device. Finally, at step 2-4 the network node transmits the data to the wireless device in the eco state. In this example, the data transmission is performed based on the measurement related information received in response to the unicast notification message. However, as previously noted with reference to FIG. 1, the data transmission may be possible without any measurement related information, for example if the network node is already aware of where the wireless device is located or a predefined modulation and coding level is being employed.

There are many ways in which the measurement related information may be used to transmit the data to the wireless device. In some implementations, based on the measurement related information, the network node determines one or more base stations from which the data is to be transmitted. Such determination may be made by estimating a location of the wireless device using the measurement related information, and selecting one or more base stations based on the location of the wireless device. In further implementations, for each base station that has been selected, the network node determines a coding and modulation level for transmitting the data. Since the measurement related information received in response to the unicast notification message is current, the network node may be in a good position to appropriately select base station(s) and appropriately select a coding and modulation level for each base station that has been selected.

In some implementations, as similarly described above with reference to FIG. 1, the wireless device in the eco state may periodically send measurement related information to the network node on a relatively infrequent basis. The network node may receive this measurement related information prior to the unicast notification message being sent. If measurement related information is later received in response to the unicast notification message, such measurement related information is additional measurement related information that may be used for transmitting the data at step 2-4, particularly because the additional measurement related information is current. In some implementations, the additional measurement related information is received on a more frequent basis than the relatively infrequent basis of the measurement related information prior to the unicast notification message. As a specific example, while the relatively infrequent basis may involve sending measurement related information every 500 ms, the more frequent basis may involve sending measurement related information every 5 ms. In some implementations, the unicast notification message includes an explicit indication that prompts the wireless device to provide the measurement related information. In further implementations, the unicast notification message includes information related to resources on which the additional measurement information is to be transmitted. In other implementations, the unicast notification message does not include any explicit indication, but rather includes an implicit indication or no indication at all.

In some implementations, the unicast notification message indicates timing of when the data is to be transmitted. Thus, for example, the wireless device in the eco state may try to receive the data over a data channel according to the timing indicated by the unicast notification message. Note that the wireless device may refrain from trying to receive data at other times, which can result in power savings. In some implementations, the timing is determined by the network node based on latency requirements or QoS (Quality of Service). Alternatively, the timing may be preconfigured. When the timing has been preconfigured, the unicast notification message may not indicate the timing. For instance, if the data transmission is scheduled to occur at a predefined time after the unicast notification message, then the wireless device can try to receive the data after the predefined time has passed since the unicast notification message. As a specific example, the data transmission may be scheduled to occur precisely 10 μs after the unicast notification message. In alternative implementations, the wireless device is not provided with any timing information and it is not known precisely when the data transmission may occur. In such alternative implementations, the wireless device may perform blind detection, which involves the wireless device continuously trying to receive data.

Wireless Device Method

Figure 3:
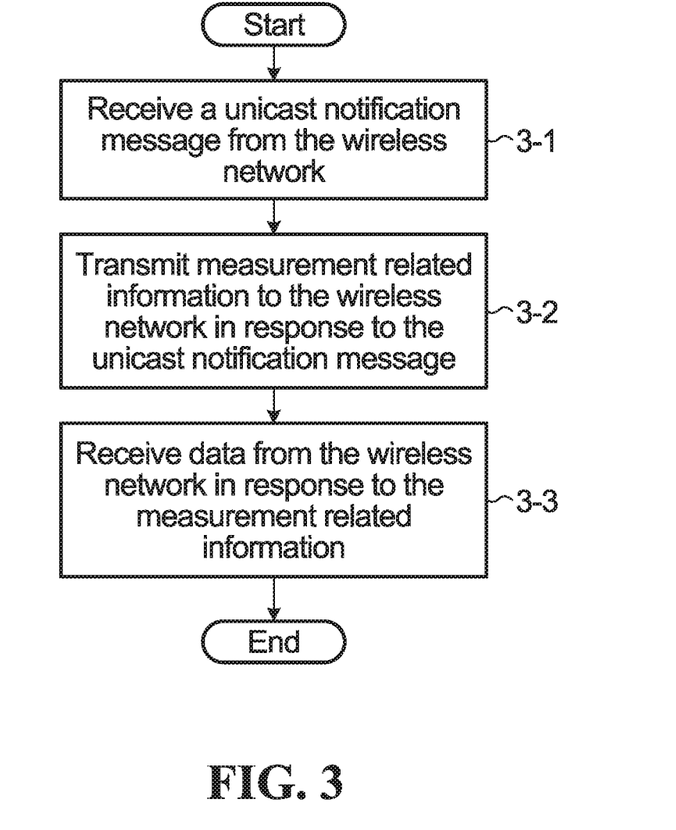
FIG. 3 is a flowchart of a method for a wireless device in an eco state to receive data from a wireless network, in accordance with an embodiment of the disclosure.

Referring now to FIG. 3, shown is a flowchart of a method for a wireless device in an eco state to receive data from a network node. This method may be implemented by a wireless device, for example by the eco state receive function 12 of the wireless device 10 shown in FIG. 1. More generally, this method may be implemented by any appropriate wireless device having an eco state. The wireless device may be a mobile wireless device, or a stationary wireless device.

For this method, it is assumed that the wireless device is in the eco state. If there is data to transmit to the wireless device, then the wireless network transmits a unicast notification message to the wireless device. At step 3-1, the wireless device receives the unicast notification message from the wireless network. The unicast notification message serves to inform the wireless device of an impending data transmission, and may for example be provided on a control channel or another channel having low resources. In some implementations, as shown at step 3-2, the wireless device responds to the unicast notification message by transmitting measurement related information to the wireless network. Examples of measurement related information have been provided above with reference to FIG. 1. If the wireless network receives the measurement related information, then the wireless network may utilize the measurement related information to transmit the data as similarly described with reference to FIG. 2. Finally, at step 3-3 the wireless device receives data from the wireless network in accordance with the unicast notification message. To this end, the wireless device might for example try to receive data for a time period following the unicast notification message.

In some implementations, as similarly described above with reference to FIG. 2, the wireless device in the eco state may periodically send measurement related information to the network node on a relatively infrequent basis prior to the unicast notification message being sent. Thus, if the measurement related information is later transmitted in response to the unicast notification message, such measurement related information is additional measurement related information. In some implementations, as similarly described above with reference to FIG. 2, the additional measurement related information is sent on a more frequent basis than the relatively infrequent basis of the measurement related information prior to the unicast notification message.

In some implementations, as similarly described above with reference to FIG. 2, the unicast notification message indicates timing of when the data is to be transmitted. Thus, the wireless device can use this information to schedule when it tries to receive data. In alternative implementations, as similarly described above with reference to FIG. 2, the wireless device is not provided with any timing information and it is not known precisely when the data transmission may occur. In such alternative implementations, the wireless device may perform blind detection, which involves the wireless device continuously trying to receive data. In some implementations, as similarly described above with reference to FIG. 2, the unicast notification message may also include (1) an indication for the wireless device to send additional measurement information and (2) information related to resources on which the additional measurement information is transmitted.

Another Wireless Network Method

As noted above for FIG. 1, unicast notification may be conditionally enabled or disabled. An example method for transmitting data to a wireless device based on whether unicast notification is enabled or disabled is described below with reference to FIG. 4.

Figure 4:
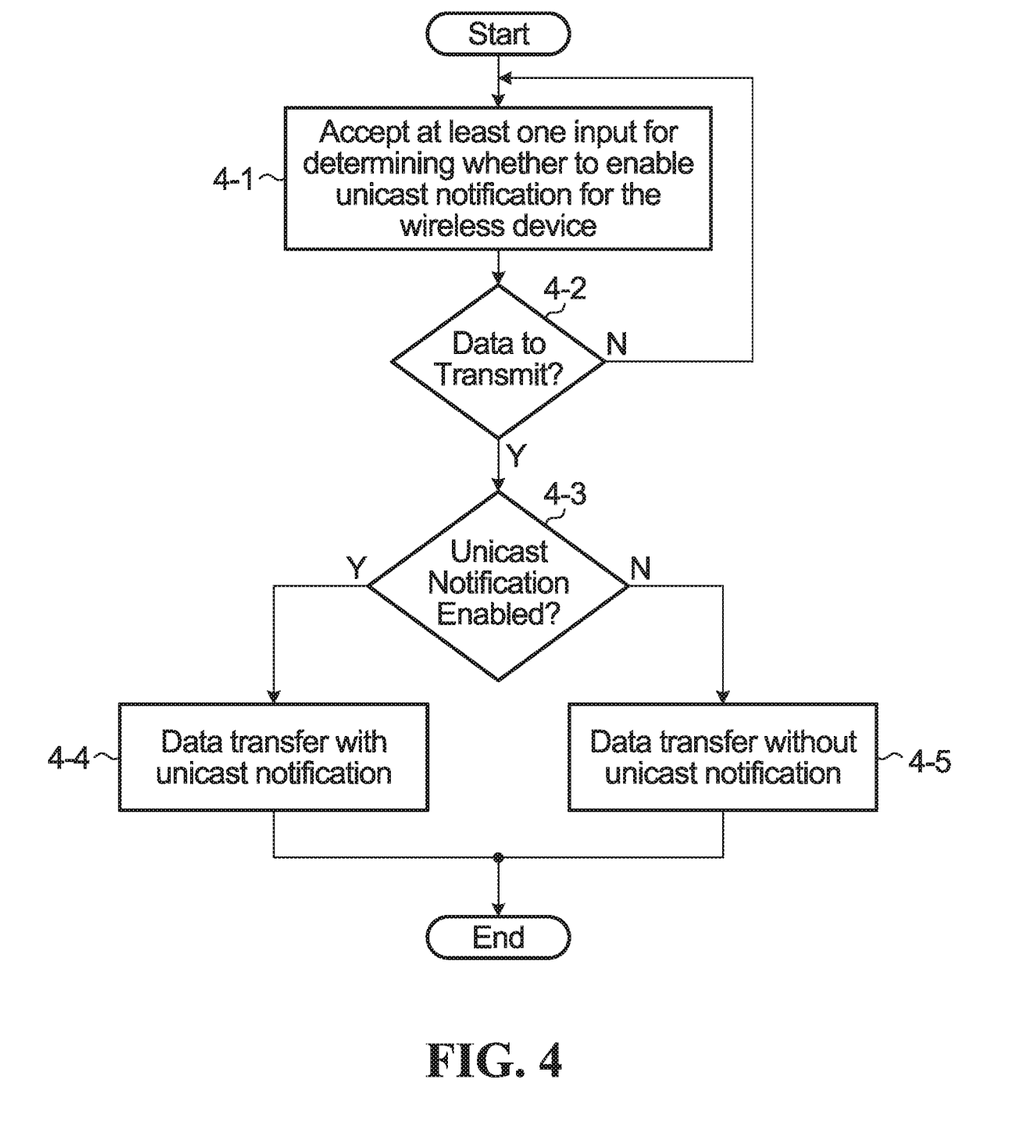
FIG. 4 is a flowchart of another method for a wireless network to transmit data to a wireless device while the wireless device is in an eco state, in accordance with an embodiment of the disclosure.

Referring now to FIG. 4, shown is a flowchart of another method for a network node to transmit data to a wireless device while the wireless device is in an eco state. This method may be implemented by a network node of a wireless network, for example by the eco state transmit function 22 of the network node 20 shown in FIG. 1. More generally, this method may be implemented by any appropriate network node such as a data notification controller. The network node may be a discrete component or integrated with one or more network components.

At step 4-1, the network node accepts at least one input for determining whether to enable unicast notification for a wireless device in the eco state. Examples of this are provided below. If at step 4-2 the network node has data to transmit to the wireless device in the eco state, then at steps 4-3 through 4-5 the network node transmits the data to the wireless device based on whether unicast notification has been enabled for the wireless device. In particular, if unicast notification has been enabled for the wireless device, then at step 4-4 the network node transmits the data to the wireless device with unicast notification. Examples of transmitting data with unicast notification have been provided above with reference to FIGS. 1 through 3. However, if unicast notification has been disabled for the wireless device, then at step 4-5 the network node transmits the data to the wireless device without unicast notification.

The transmission at step 4-5 involves transmitting the data to the wireless device without any unicast notification message being sent to inform the wireless device of the impending data transmission. This wireless device may perform blind detection, which involves the wireless device continuously trying to receive data in absence of the unicast notification.

Regardless of whether the data transmission is executed at step 4-4 or 4-5, the data transmission is scheduling-free and may be accomplished with a reduced set of radio resources (reserved or pre-configured). This is because the wireless device is in the eco state. The data transmission might for example use a subset of SCMA (Sparse Code Multiple Access) codebooks, or SCMA codebooks with one non-zero element. Other implementations are possible.

There are many possible inputs for determining whether to enable unicast notification for the wireless device in the eco state. In some implementations, the network node receives from the wireless device an indication of preference for enabling unicast notification. For example, if the wireless device is not mobile but instead forms part of a home appliance such as a refrigerator, then the wireless device may convey a preference to disable unicast notification. Another example is a gas meter installed on a premise. As previously noted, for non-mobile devices, there may be no need for the unicast notification. Thus, disabling unicast notification may be preferred for these devices. Conversely, if the wireless device is mobile, then the wireless device may convey a preference to enable unicast notification.

The indication of preference can be explicit or implicit. As an example of explicit preference, an explicit indication can be sent for example upon initial network access (e.g. power-up). As an example of implicit preference, the indication of preference may be an indication of mobility type (i.e. fixed terminal or mobile terminal) from which preference is implicitly conveyed. The indication of mobility type might be a device equipment ID such as a new kind of IMEI (International Mobile Station Equipment Identity) with a certain digit(s) indicating terminal type. This may be set by a manufacturer of wireless devices (e.g. household appliances, smartphones, tablets, etc.) A mobility type field (e.g. flag) can be added to a wireless device default configuration stored in non-volatile memory. Upon powering on the wireless device, the content of the mobility type field can be read and the indication of preference may be set accordingly.

Note that factors other than mobility type may be considered by the wireless device in determining preference for enabling unicast notification. For instance, the preference for enabling unicast notification may be based on location history of the wireless device, QoS of traffic, etc. Thus, for example, if a mobile device has not been moving and has low QoS of traffic, then it may be preferred to disable unicast notification. Conversely, if the mobile device has been moving and has high QoS of traffic, then it may be preferred to enable unicast notification. In another example, a non-mobile device may want to enable unicast notification in order to further reduce power consumption since monitoring and decoding a unicast notification takes less processing power than decoding actual data. In yet another example, a wireless device may want to disable unicast notification in the eco state due to the QoS requirement (e.g. latency) of the traffic.

In other implementations, the network node receives tracking information from a network-side mobility tracking module. The tracking information might for example convey location history and/or predicted path(s) of the mobile device. Based on the tracking information, the network node may determine whether the network node has the ability to track or adequately track conditions of the mobile device (e.g. movement of the mobile device, channel variation of the mobile device, etc.) to satisfy QoS of traffic. If the network node has the ability to track or adequately track boundary conditions of the mobile device, then unicast notification may be disabled. Otherwise, unicast notification may be enabled.

In other implementations, the network node receives signalling from the mobile device from which the network node may determine whether the network node has the ability to track or adequately track boundary conditions of the mobile device to satisfy QoS of traffic. The signalling may for example include an SRS (Sounding Reference Signal) from the mobile device and/or upload data from the mobile device. If the network node has the ability to track or adequately track boundary conditions of the mobile device based on this signalling, then unicast notification may be disabled. Otherwise, unicast notification may be enabled.

In other implementations, the network node receives a combination of two or more inputs for determining whether to enable unicast notification for the wireless device in the eco state. Thus, the network node may consider several conditions when determining whether to enable or disable unicast notification. For example, the network node may consider both (1) an indication of preference from the wireless device for enabling unicast notification and (2) signalling from the mobile device from which the network node may determine whether the network node has the ability to track or adequately track boundary conditions of the mobile device to satisfy QoS of traffic. In some implementations, upon determining whether to enable or disable unicast notification, the network node conveys to the wireless device an indication of whether unicast notification is enabled.

Figure 5:
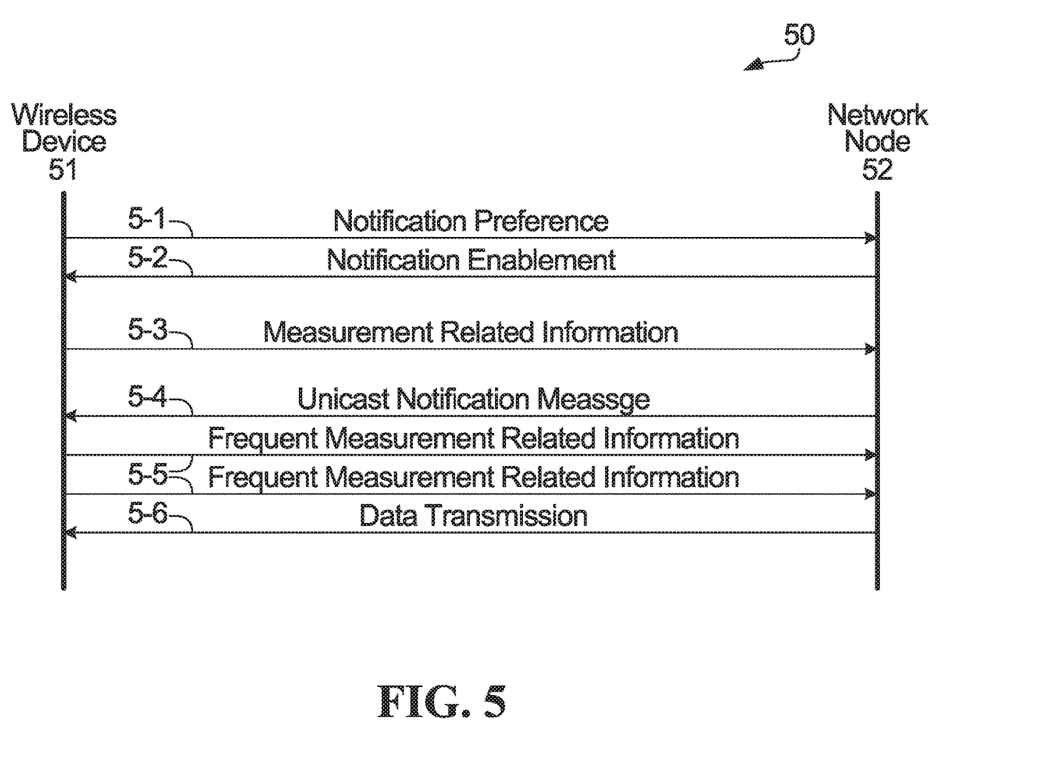
FIG. 5 is a signalling diagram for a wireless system featuring a wireless device and a network node of a wireless network, in accordance with an embodiment of the disclosure.

Referring now to FIG. 5, shown is a signalling diagram 50 for a wireless system featuring a wireless device 51 and a network node 52 of a wireless network. It is to be understood that the signalling diagram is shown with specific signalling for exemplary purposes only. Also, while the signalling diagram depicts signalling between the wireless device 51 and the network node 52, it is to be understood that there may be intermediate components such as a base station for example.

In some implementations, as shown at step 5-1, the wireless device 51 sends a notification preference message to the network node 52 in order to convey a preference for enabling unicast notification for the wireless device 51 in an eco state. In response, the network node 52 determines based on the notification preference whether unicast notification is to be enabled for the wireless device 51 in the eco state. The notification preference may help the network node 52 to reach a decision much quicker than relying on uplink measurement and mobility tracking information. However, the determination could additionally or alternatively be based on uplink measurement and mobility tracking information as similarly described above with reference to FIG. 4.

In some implementations, as shown at step 5-2, the network node 52 sends a notification enablement message to the wireless device 51 in order to convey whether unicast notification has been enabled for the wireless device 51 in the eco state. In this particular example, it is assumed that the network node 52 has enabled unicast notification for the wireless device 51 in the eco state, so the notification enablement message indicates this enablement.

In some implementations, as shown at step 5-3, the wireless device 51 sends measurement related information to the network node 52 from time to time. Examples of measurement related information have been provided above with reference to FIG. 1. The measurement related information may be sent on a relatively infrequent basis as described above with reference to FIGS. 1 through 3. Note that the measurement related information may be insufficient for the network node 52 to precisely determine where the wireless device 51 is located, especially if the wireless device 51 has been physically moving.

According to an embodiment of the disclosure, if there is data to be transmitted to the wireless device 51 in the eco state, then at step 5-4 the network node 52 operates to transmit a unicast notification message to the wireless device 51 in order to inform the wireless device 51 of the impending data transmission. In some implementations, the unicast notification message is provided over a control channel, which may involve fewer resources than the data channel. In some implementations, as shown at step 5-5, the wireless device 51 responds with measurement related information on a more frequent basis than the relatively infrequent basis. In any event, by using the measurement related information provided in response to the unicast notification message, the network node 52 can then transmit the data to the wireless device 51 in the eco state at step 5-6. In some implementations, the data transmission occurs over the data channel.

The option to send additional measurement information can be configured by the wireless network as described previously. In other implementations, the wireless device may indicate to the wireless network its preference to send additional measurement information. Such preference information can be included in measurement related information that is sent from time to time as shown at step 5-3. In other implementations, such preference information can be sent during uplink data transmission. In yet another implementation, the preference information can be sent at step 5-1 with the notification preference message. Other implementations are possible.

Computer Readable Medium

In accordance with another embodiment of the disclosure, there is provided a non-transitory computer readable medium having computer executable instructions stored thereon for execution on a processor so as to implement any of the methods described herein. The non-transitory computer readable medium might for example be an optical disk such as a CD (Compact Disc), a DVD (Digital Video Disc), or a BD (Blu-Ray Disc). Alternatively, the non-transitory computer readable medium might for example be a memory stick, a memory card, a disk drive, a solid state drive, etc. Other non-transitory computer readable media are possible and are within the scope of this disclosure. More generally, the non-transitory computer readable medium can be any tangible medium in which the computer executable instructions can be stored.

Numerous modifications and variations of the present disclosure are possible in light of the above teachings. It is therefore to be understood that within the scope of the appended claims, the disclosure may be practiced otherwise than as specifically described herein.

We claim:

1. A method comprising:
sending, by a network node, a message in a unicast manner to a wireless device that is in a state, the message being associated with an impending transmission of data to the wireless device but excluding scheduling information associated with timing of the transmission of the data, wherein the message is to inform the wireless device of the transmission of the data, wherein the state is different from an active state; and
transmitting, by the network node, the data to the wireless device while the wireless device remains in the state that is different from the active state.

2. The method according to claim 1, the state supporting a data transfer connectivity without dynamic resource allocation grant from the network node.

3. The method according to claim 2, the data transfer connectivity including data transmission and reception.

4. The method according to claim 1, wherein the network node transmits the data at a time after sending the message.

5. The method according to claim 4, information associated with the time being preconfigured by the network node to the wireless device.

6. The method according to claim 4, wherein no information associated with the time is preconfigured by the network node to the wireless device.

7. The method according to claim 1, wherein after sending the message, the network node receives no measurement related information from the wireless device that is in the state before transmitting the data and the network node transmits the data with a predefined modulation and coding level.

8. The method according to claim 7, wherein the network node is aware of where the wireless device is located before transmitting the data.

9. The method according to claim 1, wherein after sending the message, the network node receives measurement related information in a response from the wireless device that is in the state before transmitting the data and the network node transmits the data according to the received measurement related information.

10. The method according to claim 9, the message indicating that the wireless device is to provide the measurement related information.

11. The method according to claim 9, the measurement related information including one or more of uplink sounding reference signals, measurement from downlink pilots and/or data, uplink data, mobility tracking information and location prediction information.

12. A method comprising:
receiving, by a wireless device that is in a state, a unicast message from a network node, the message being associated with an impending transmission of data to the wireless device but excluding scheduling information associated with timing of the transmission of the data, wherein the message is to inform the wireless device of the transmission of the data, wherein the state is different from an active state; and
receiving, by the wireless device while the wireless device remains in the state that is different from the active state, the data from the network node.

13. The method according to claim 12, the state supporting a data transfer connectivity without dynamic resource allocation grant from the network node.

14. The method according to claim 13, the data transfer connectivity including data transmission and reception.

15. The method according to claim 12, wherein the wireless device receives the data at a time after receiving the unicast message.

16. The method according to claim 15, information associated with the time being preconfigured in the wireless device.

17. The method according to claim 15, wherein no information associated with the time is preconfigured in the wireless device.

18. The method according to claim 17, wherein after receiving the unicast message, the wireless device that is in the state performs a blind detection to receive the data.

19. The method according to claim 18, wherein during the blind detection, the wireless device continuously tries to receive data.

20. The method according to claim 12, wherein after receiving the unicast message, the wireless device that is in the state sends no measurement related information to the network node before receiving the data.

21. The method according to claim 12, wherein after receiving the unicast message, the wireless device that is in the state sends a response including measurement related information to the network node before receiving the data.

22. The method according to claim 21, the unicast message indicating that the wireless device is to provide the measurement related information.

23. The method according to claim 21, the measurement related information including one or more of uplink sounding reference signals, measurement from downlink pilots and/or data, uplink data, mobility tracking information and location prediction information.

24. An apparatus comprising a processor coupled with a memory, the processor configured to:
send a message in a unicast manner to a wireless device that is in a state, the message being associated with an impending transmission of data to the wireless device but excluding scheduling information associated with timing of the transmission of the data, wherein the message is to inform the wireless device of the transmission of the data, wherein the state is different from an active state; and
transmit the data to the wireless device while the wireless device remains in the state that is different from the active state.

25. An apparatus comprising a processor coupled with a memory, the processor configured to:
receive a unicast message from a network node, the message being associated with an impending transmission of data to the wireless device but excluding scheduling information associated with timing of the transmission of the data, wherein the message is to inform the wireless device of the transmission of the data, wherein the apparatus is operating in a state, the state being different from an active state; and
receive, while the wireless device remains in the state that is different from the active state, the data from the network node.

* * * * *